United States Patent
Lortz et al.

(10) Patent No.: US 10,723,628 B2
(45) Date of Patent: Jul. 28, 2020

(54) SIO2 CONTAINING DISPERSION WITH HIGH SALT STABILITY

(71) Applicant: Evonik Degussa GmbH, Essen (DE)

(72) Inventors: Wolfgang Lortz, Wächtersbach (DE); Ulrich Fischer, Mömbris (DE); Christian Panz, Wesseling-Berzdorf (DE); Gabriele Bergmann, Grosskrotzenburg (DE)

(73) Assignee: Evonik Operations GmbH, Essen (DE)

( * ) Notice: Subject to any disclaimer, the term of this patent is extended or adjusted under 35 U.S.C. 154(b) by 169 days.

(21) Appl. No.: 15/743,177

(22) PCT Filed: Jun. 28, 2016

(86) PCT No.: PCT/EP2016/064966
§ 371 (c)(1),
(2) Date: Jan. 9, 2018

(87) PCT Pub. No.: WO2017/009033
PCT Pub. Date: Jan. 19, 2017

(65) Prior Publication Data
US 2019/0106328 A1    Apr. 11, 2019

(30) Foreign Application Priority Data
Jul. 10, 2015 (EP) .................... 15176279

(51) Int. Cl.
C01B 33/149 (2006.01)
C01B 33/141 (2006.01)
C01B 33/159 (2006.01)
C01B 33/14 (2006.01)

(52) U.S. Cl.
CPC ............ *C01B 33/149* (2013.01); *C01B 33/14* (2013.01); *C01B 33/1417* (2013.01); *C01B 33/159* (2013.01); *C01P 2004/62* (2013.01); *C01P 2004/64* (2013.01); *C01P 2006/12* (2013.01); *C01P 2006/22* (2013.01)

(58) Field of Classification Search
None
See application file for complete search history.

(56) References Cited

U.S. PATENT DOCUMENTS

| | | | |
|---|---|---|---|
| 5,981,131 A * | 11/1999 | Hirama | C09C 1/3081 430/108.3 |
| 6,036,808 A | 3/2000 | Shaw-Klein et al. | |
| 8,017,098 B2 | 9/2011 | Uhrlandt et al. | |
| 8,885,341 B2 | 11/2014 | Desmarets | |
| 8,911,638 B2 | 12/2014 | Lortz | |
| 8,980,784 B2 | 3/2015 | Schultz Isfort et al. | |
| 10,144,858 B2 | 12/2018 | Kennedy | |
| 2002/0121156 A1* | 9/2002 | Menzel | B82Y 30/00 75/255 |
| 2002/0168312 A1 | 11/2002 | Mangold et al. | |
| 2002/0172827 A1 | 11/2002 | O'Connor et al. | |
| 2003/0185739 A1 | 10/2003 | Mangold et al. | |
| 2003/0220204 A1 | 11/2003 | Baran et al. | |
| 2004/0037964 A1 | 2/2004 | Davies et al. | |
| 2004/0241101 A1 | 12/2004 | Baran et al. | |
| 2005/0133766 A1 | 6/2005 | Barthel et al. | |
| 2005/0282935 A1 | 12/2005 | Christian | |
| 2006/0093541 A1 | 5/2006 | Uhrlandt et al. | |
| 2006/0134606 A1* | 6/2006 | Montagu | G01N 33/54366 435/5 |
| 2007/0110906 A1 | 5/2007 | Edelmann et al. | |
| 2009/0301345 A1 | 12/2009 | Mangold et al. | |
| 2010/0092765 A1 | 4/2010 | Hager et al. | |
| 2010/0107930 A1 | 5/2010 | Lortz et al. | |
| 2010/0181525 A1* | 7/2010 | Belmont | B82Y 30/00 252/79.1 |
| 2010/0288963 A1 | 11/2010 | Mitina et al. | |
| 2010/0301264 A1 | 12/2010 | Mangold et al. | |
| 2011/0028662 A1 | 2/2011 | Wiesner et al. | |
| 2011/0118382 A1 | 5/2011 | Reichenbach-Klinke | |
| 2011/0245391 A1 | 10/2011 | Karpov | |
| 2013/0071649 A1 | 3/2013 | Hager et al. | |
| 2013/0303361 A1 | 11/2013 | Schultz Isfort et al. | |
| 2014/0292951 A1 | 10/2014 | Ferrar et al. | |

(Continued)

FOREIGN PATENT DOCUMENTS

WO    WO 02/22745      3/2002
WO    WO 2004/035474   4/2004
(Continued)

OTHER PUBLICATIONS

Ludox Technical Literature, 1999. (Year: 1999).*
Gelest Silane Coupling Agents (Year: 2006).*
Restriction Requirement dated Jul. 23, 2018, for copending U.S. Appl. No. 15/743,242.
Response to Restriction Requirement filed Sep. 19, 2018, for copending U.S. Appl. No. 15/743,242.
Office Action dated Oct. 5, 2018, for copending U.S. Appl. No. 15/743,242.
Google Patents. English translation of WO 2009/119178 A1. https://patents.google.com/patent/WO2009119178A1/en accessed Oct. 4, 2018, originally published Oct. 1, 2009, 21 printed pages. (Year 2009).

(Continued)

*Primary Examiner* — Christopher M Rodd
(74) *Attorney, Agent, or Firm* — Law Office of: Michael A. Sanzo, LLC

(57) ABSTRACT

Dispersion comprising particles of a surface-modified, hydrophilic silica,
where
A) the particles of the surface-modified, hydrophilic silica comprise an aluminium atom and a hydrocarbon radical,
  a) the aluminium atom is bonded via an oxygen atom to a silicon atom of the particle surface,
  b) the hydrocarbon radical comprises a silicon atom which is bonded to a carbon atom of the hydrocarbon radical,
  c) possess an average particle diameter $d_{50}$ in the dispersion of 40-200 nm, preferably 60-150 nm, and
B) the pH of the dispersion is 8 or more.

11 Claims, No Drawings

(56) References Cited

U.S. PATENT DOCUMENTS

| | | | |
|---|---|---|---|
| 2015/0075798 A1 | 3/2015 | Tang et al. | |
| 2015/0159074 A1 | 6/2015 | Luyster | |
| 2017/0151136 A1* | 6/2017 | Kim | A61K 8/25 |
| 2017/0166805 A1 | 6/2017 | Schultheiss | |
| 2018/0194947 A1 | 7/2018 | Lortz et al. | |
| 2018/0312741 A1 | 11/2018 | Lortz et al. | |
| 2019/0127587 A1 | 5/2019 | Lortz et al. | |

FOREIGN PATENT DOCUMENTS

| | | |
|---|---|---|
| WO | WO 2008/071462 | 6/2008 |
| WO | WO-2009/119178 A1 | 10/2009 |
| WO | WO 2010/042672 | 4/2010 |
| WO | WO 2014/020061 | 2/2014 |
| WO | WO 2017/071985 | 5/2017 |

OTHER PUBLICATIONS

Grace Davison Engineered Materials. "Ludox® Colloidal Silca in Coatings Lithium Polysillicate in Coatings." Obtained from https://grace.com/coatings-and-inks/en-us/Documents/LUDOX%20Coatings%20TI.pdf on Oct. 4, 2018. pp. 1-6 (Year 2018).
Zhang, et al., "Synthesis of poly(ethylene glycol) (PEG)-grafted colloidal silica particles with improved stability in aqueous solvents," *Journal of Colloid and Interface Science* 310:446-455 (available on line Feb. 2007).
Response to Office Action filed Jun. 7, 2019, for copending U.S. Appl. No. 15/743,242.
Restriction Requirement dated Apr. 8, 2019, for copending U.S. Appl. No. 15/743,214.
Response to Restriction Requirement for copending U.S. Appl. No. 15/743,214, filed Jun. 29, 2019.
Office Action for copending U.S. Appl. No. 15/743,242, dated Jul. 3, 2019.
Office Action for copending U.S. Appl. No. 15/743,214, dated Sep. 17, 2019.
Response to Office Action and RCE for copending U.S. Appl. No. 15/743,242, filed Oct. 8, 2019.
Park, et al., "Effect of PEG molecular weight on stability, $T_2$ contrat, cytotoxicity, and cellular uptake of superparamagnetic iron oxide nanoparticles," *Colloids and Surfaces B: Biointerfaces*,119:106-114 (available online May 2014).
Amendment and Response to Office Action Filed Jan. 7, 2019, for copending U.S. Appl. No. 15/743,242.
Office Action dated Mar. 7, 2019, for copending U.S. Appl. No. 15/743,242.
Hall, C.A., "Deposition of Aluminium Oxide Modified Core-shell Silica Particles onto Silica Surfaces," Thesis, University of Manchester, 2010, pp. 1-90; (2010).
Sigma-Aldrich; Ludox CL Colloidal Silica; https:www.sigmaaldrich.com/catalog/product/aldrich/420883?lang=en&region=US; accessed Jan. 8, 2019; 3 printed pages; (2019).
Sigma-Aldrich; Ludox CL Colloidal Silica; https:www.sigmaaldrich.com/catalog/product/aldrich/420891?lang=en&region=US ; accessed Jan. 8, 2019; 3 printed pages; (2019).
English translation of the International Search Report for PCT/EP2016/064966 filed Jun. 28, 2016.
English translation of the Written Opinion of the International Searching Authority for PCT/EP2016/064966 filed Jun. 28, 2016.
English translation of the International Preliminary Report on Patentability for PCT/EP2016/064966 filed Jun. 28, 2016.
English translation of the International Search Report for PCT/EP2016/064955 filed Jun. 28, 2016 for copending U.S. Appl. No. 15/743,242.
English translation of the Written Opinion of the International Searching Authority for PCT/EP2016/064955 filed Jun. 28, 2016 for copending U.S. Appl. No. 15/743,242.
English translation of the International Preliminary Report on Patentability for PCT/EP2016/064955 filed Jun. 28, 2016 for copending U.S. Appl. No. 15/743,242.
English translation of the International Search Report for PCT/EP2016/064994 filed Jun. 28, 2016 for copending U.S. Appl. No. 15/743,214.
English translation of the Written Opinion of the International Searching Authority for PCT/EP2016/064994 filed Jun. 28, 2016 for copending U.S. Appl. No. 15/743,214.
English translation of the International Preliminary Report on Patentability for PCT/EP2016/064994 filed Jun. 28, 2016 for copending U.S. Appl. No. 15/743,214.
Metin. et al., "Stability of Aqueous Silica Nanoparticle Dispersions under Subsurface Conditions," *Clean Technology* www.ct-si.org, ISBN 978-1-4398-3419-0 pp. 25-28 (2010).
Gonzalez-Matheus, et al., "Pickering-Stabilized Latexes with High Silica Incorporation and Improved Salt Stability," *Part. Part. Syst. Charact.* 31:94-100 (2014).
U.S. Appl. No. 15/743,214, filed Jan. 9, 2018, Lortz.
U.S. Appl. No. 15/743,242, filed Jan. 9, 2018, Lortz.
Office Action for copending U.S. Appl. No. 15/770,786, dated Oct. 3, 2019.
Office Action for copending U.S. Appl. No. 15/743,242, dated Dec. 5, 2019.
Amendment and Response for copending U.S. Appl. No. 15/743,214, filed Dec. 17, 2019.
Amendment and Response for copending U.S. Appl. No. 15/770,786, filed Jan. 3, 2020.
Final Office Action for copending U.S. Appl. No. 15/743,214, dated Jan. 7, 2020.
Amendment and Response for copending U.S. Appl. No. 15/743,242, filed Mar. 12, 2014.
English translation of the International Search Report for PCT/EP2016/074923 filed Oct. 18, 2016 for copending U.S. Appl. No. 15/770,786.
English translation of the Written Opinion of the International Searching Authority for PCT/EP2016/074923 filed Oct. 18, 2016 for copending U.S. Appl. No. 15/770,786.
English translation of the International Preliminary Report on Patentability for PCT/EP2016/074923 filed Oct. 18, 2016 for copending U.S. Appl. No. 15/770,786.
Aurand, et al., "Comparison of Oil Recovery for Six Nanofluids in Berea Sandstone Cores," International Symposium of the Society of Core Analysts, Avignon, France, Sep. 8, 2011.
Hendraningrat, et al., "A Coreflood Investigation of Nanofluid Enhanced Oil Recovery in Low-Medium Permeability Berea Sandstone," *SPE 164106*:1-14 (Apr. 2013).
Ibrahim, et al., "Understanding the Mechanism of Nanoparticles Applications in Enhanced Oil Recovery," *SPE 175806-MS*:1-19 (Apr. 2015).
McElfresh, et al., "Stabilizing Nano Particle Dispersions in High Salinity, High Temperature Downhole Environments," *SPE 154758*:1-6 (Jan. 202).
Roustaei, et al., "An evaluation of modified silica nanoparticles' efficiency in enhancing oil recovery of light and intermediate oil reservoirs," *Egyptian Journal of Petroleum* 22:427-433 (Dec. 2013).
Vuorinen, et al., "Thermooxidative degradation of LDPE nanocomposites: Effect of surface treatments of fumed silica and boehmite alumina," *Polymer Degradation and Stability* 98(11)2297-2305 (Aug. 2013).
U.S. Appl. No. 15/770,786, filed Apr. 25, 2018, Lortz.
Notice of Abandonment dated Mar. 17, 2020 for copending U.S. Appl. No. 15/743,214.
Non Final Office Action dated Mar. 26, 2020 for copending U.S. Appl. No. 15/743,242.
Notice of Allowance dated Apr. 14, 2020 for copending U.S. Appl. No. 15/770,786.
Response to Non Final Office Action filed May 6, 2020 for copending U.S. Appl. No. 15/743,242.
Miscellaneous Action with proposed Examiner amendments, dated Jun. 12, 2020, for copending U.S. Appl. No. 15/743,242.

* cited by examiner

SIO2 CONTAINING DISPERSION WITH HIGH SALT STABILITY

CROSS REFERENCE TO RELATED APPLICATIONS

The present application is US national stage of international application PCT/EP2016/064966, which had an international filing date of Jun. 28, 2016, and which was published in German under PCT Article 21(2) on Jan. 19, 2017. Priority is claimed to European application EP 15176279.6, filed on Jul. 10, 2015.

The invention relates to $SiO_2$-containing dispersions with high salt stability, their preparation and use.

Improving the stability of aqueous silicon dioxide dispersions is a research topic. Attempts are commonly made to protect the dispersion from sedimentation and reagglomeration by providing the silicon dioxide particles with appropriate surface modification.

Thus, for example, US2004241101 discloses a stable pharmaceutical dispersion which comprises silicon dioxide particles surface-modified with polyethylene glycols. The latter may be obtained, for example, by reacting an ammonia-stabilized colloidal silicon dioxide with a polyethoxylated trialkoxysilane.

US2002172827 is concerned with topics including the production of redispersible, nanoscale silicon dioxide particles. In that case a negatively charged silica sol is coated with an aluminium oxide. Added subsequently as surface-modifying agent is sodium dodecylbenzenesulphonate.

WO2004035474 claims a process for producing a stable aqueous dispersion which is obtained by mixing silanized, colloidal silicon dioxide particles with an organic binder. A glycidylepoxysilane is an example of a silanizing agent used. The organic binder may be a polyethylene glycol.

In Part. Syst. Charact. 2014, 31, 94-100, colloidal silicon dioxide particles are surface-modified with 2-[methoxy (polyethyleneoxy)propyl]trimethoxysilane, in order to increase the salt stability. The salt stability is also a topic in Clean Technology, www.ct-si.org, ISBN 978-1-4398-3419-0 (2010) 25-28.

WO 03/106339 describes a precipitated silica having a BET surface area of 150-400 $m^2/g$, a CTAB surface area of 140-350 $m^2/g$ and an $Al_2O_3$ content of 0.2-5 wt %. This silica can be modified with a multiplicity of silanes and is able to lead to both hydrophilic and hydrophobic products. The ratio of silane to precipitated silica as well can be varied over wide limits, namely 0.5 to 50 parts of silane per 100 parts of precipitated silica. The reaction may take place in the dispersion of the precipitated silica, with subsequent drying and heat treatment. Conditions for this are not stated, and the properties of the dispersion are not further specified.

WO 02/22745 discloses a method for priming steel that uses an aqueous aluminium oxide-silicon dioxide sol with 0.05-2.0 wt % of aluminium oxide.

The aluminium oxide-silicon dioxide sol may comprise a silane coupling agent which contains alkoxysilane groups and an organic radical having a functional group, such as an amino, epoxide or isocyanate.

WO 2010/042672 discloses a coating composition for thermoplastic and thermoset substrates, comprising an aqueous dispersion having a pH of less than 7.5. This dispersion comprises surface-modified silicon dioxide nanoparticles with an average particle diameter of 40 nm or less, an alkoxysilane oligomer, and a silane coupling agent. Suitable surface modifiers are those which have a radical that is able to react with the silanol groups on the silicon dioxide surface, and also have a hydrophilic radical, as for example an acid radical, an ammonium radical, a polyoxyethylene radical or a hydroxyl group.

It has emerged, however, that for a number of applications the salt stability attained is not sufficient. It was an object of the present invention, therefore, to provide a dispersion having improved salt stability. Another object of the invention was to provide a process for preparing this dispersion.

The invention provides an aqueous dispersion comprising particles of a surface-modified, hydrophilic silica, where
A) the particles of the surface-modified, hydrophilic silica comprise an aluminium atom and a hydrocarbon radical,
   a) the aluminium atom is bonded via an oxygen atom to a silicon atom of the particle surface,
   b) the hydrocarbon radical comprises a silicon atom which is bonded to a carbon atom of the hydrocarbon radical,
   c) possess an average particle diameter $d_{50}$ in the dispersion of 40-200 nm, preferably 60-150 nm, and
B) the pH of the dispersion is 8 or more.

"Surface-modified" means that the silica on its surface carries groups which very largely give the particles the hydrophilic properties which the unmodified silica has. As a result of this, the aqueous dispersion remains stable. "Stable" means that there is no significant reagglomeration and hence no sedimentation. In an aqueous solution, hydrophobized particles would reagglomerate and separate within a very short time.

This stability is to be retained even in aqueous solutions having a high salt concentration and at elevated temperatures. For the aqueous dispersion of the present invention it is the case that a 0.5 weight percent aqueous dispersion is stable in a reference solution, which simulates seawater, for at least one month at a temperature of 60° C. The stability is tested in a reference solution which is obtained by, at 23° C., a mixture of 28.500 g of NaCl, 0.220 g of $NaHCO_3$, 4.066 g of $Na_2SO4$, 1.625 g of $CaCl_2 \times 2H_2O$, 3.162 g of $MgCl_2 \times 6H_2O$, 0.024 g of $SrCl_2 \times 6H_2O$ and 0.721 g of KCl being made up with fully demineralized water to give 1000 ml of solution.

In one preferred embodiment of the invention, the fraction of Al in the surface-modified, hydrophilic silica is 50.15 mg $Al/m^2$ BET surface area. Particular preference is given to 0.05-0.15 mg $Al/m^2$ BET surface area.

With preference it is possible for such particles, prior to the surface modification, to be obtained from pyrogenic processes. In these processes, silicon compounds are reacted in a flame generated by the reaction of hydrogen and oxygen. The resulting powders are referred to as "pyrogenic" or "fumed". Formed initially in the reaction are highly disperse primary particles, which in the further course of reaction come together to form aggregates. The aggregate dimensions of these powders are generally in the µm range. The particles have hydroxyl groups on their surface. Through suitable grinding, they can be converted to the nm range which is advantageous for the present invention, and can be subsequently treated with a surface-modifying agent.

It has emerged that the best results in terms of salt stability and temperature stability of the aqueous dispersion are obtained with a surface-modified, hydrophilic silica which has an average particle diameter in the dispersion, $d_{50}$, of 40-200 nm. The average particle diameter can be determined by the customary methods known to the skilled person of light scattering for the determination of particle size distributions in dispersions.

The surface-modified, hydrophilic silica may be in the form of isolated individual particles and/or in the form of aggregated particles. In the case of aggregated particles, the average particle diameter describes the dimensions of the aggregate.

One of the characterizing features of the surface-modified, hydrophilic silica present in the aqueous dispersion of the invention is that the surface modification encompasses a hydrocarbon radical which is attached via a C atom to an Si atom. This hydrocarbon radical is to be selected such that in the aqueous dispersion, the surface-modified silica has hydrophilic properties. This is dependent, for example, on the number of carbon atoms in the hydrocarbon radical and on the presence of functional hydrophilic groups, such as hydroxyl, ether, amine or carboxyl groups. The hydrocarbon radical is preferably interrupted by one or more heteroatoms. With particular preference the heteroatom is O or N.

The carbon content of the surface-modified hydrophilic silica is preferably 3-25 wt %.

Preference is given to selecting a surface modification from the group consisting of Si—$(CH_2)_n$—$Y_m$—R,
where Si is the Si atom which is bonded via a C atom to a hydrocarbon radical, and
n=1, 2 or 3 and m=0 or 1
R is a radical which does not impart hydrophobic properties, and preferably
where m=1,
R=—H, —$CH_3$, —$C_2H_5$, —OH, —$OCH_3$, —$OC_2H_5$, —C(=O)$OCH_3$, —C(=O)$OC_2H_5$, —O—C(=O)$CH_3$, —O—C(=O)$CH_3$, —O—C(=O)CH=$CH_2$, —O—C(=O)CH=CH($CH_3$), —C(=O)$CH_3$, —C(=O)H, $NH_2$;

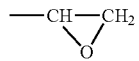

and, if m is 0, R corresponds to the aforementioned radicals but without —H, —$CH_3$, —$C_2H_5$.

Y=—(OCR$^1$R$^2$—CR$^3$R$^4$)$_o$—, o=1-30, R$^1$, R$^2$, R$^3$, R$^4$=independently of one another H or $CH_3$, more preferably o=5-15 and R$^1$, R$^2$, R$^3$, R$^4$=H;
—(OCR$^1$R$^2$—CR$^3$R$^4$—CR$^6$R$^6$)$_p$—, p=1-30, R$^1$, R$^2$, R$^3$, R$^4$, R$^5$, R$^6$=independently
or is a mixture of the aforementioned radicals R and Y.

In the aqueous dispersion of the invention, the fraction of water is preferably 50-90 wt % and of surface-modified, hydrophilic silica is preferably 10-50 wt %. Depending on the planned further use, the fraction of surface-modified, hydrophilic silica may be reduced further.

Besides water, the liquid phase may also include small fractions of alcohol, such as methanol, ethanol, propanol or butanol. The alcohol fraction is generally less than 10 wt %, preferably 3-7 wt %, based in each case on the dispersion.

The pH of the liquid phase of the dispersion is 8 or more, preferably 8-12, more preferably 9-11.

The aqueous dispersion of the invention may include small amounts, less than 100 ppm, of customary dispersants. In the context of the present invention, however, the presence of dispersants is undesirable. The stabilizing effect of the dispersion of the invention derives solely from the surface-modified, hydrophilic silica.

A further subject of the invention is a process for preparing the aqueous dispersion, in which a hydrophilic silica which has hydroxyl groups on the surface is dispersed in an aqueous solvent and subsequently an agent for surface modification is added, in which an Si atom is bonded via a C atom to a hydrocarbon radical, and the Si atom is also bonded to one or more hydroxyl groups, alkoxy groups, halide groups or mixtures thereof, and the mixture is reacted and optionally the hydrolysis product is separated off.

The amount of the surface-modifying agent is guided by the desired ratio of silica to surface-modifying agent. The carbon fraction of the surface-modified silica proves to be a suitable variable. It is preferably 3-25 wt %. In this context, account should be taken of the amount of hydroxyl groups, alkoxy groups or halide groups eliminated in the course of the hydrolysis.

A good number of methods are available to the skilled person for the dispersing. In order to produce finely divided dispersions, for example, apparatus such as ultrasound probes, ball mills, agitator-mechanism ball mills, rotor/stator machines, planetary kneaders/mixers or high-energy mills, or combinations, are available. Accordingly, for example, a preliminary dispersion can be prepared using a rotor/stator system, and in a subsequent step this preliminary dispersion is ground further by means of a high-energy mill. Through this combination it is possible, for example, to produce extremely fine dispersions having a particle diameter of 200 nm or less. In the case of a high-energy mill, a preliminary dispersion under a high pressure is divided into two or more streams, which are then released through a nozzle and impinge exactly on one another.

It has proved to be advantageous to introduce silica already in the form of an aqueous dispersion.

In general the mixture is reacted by setting a pH of 11 or more, thermally treating the mixture at a temperature of 50-95° C. over a period of 1-30 minutes, and subsequently, optionally, setting a pH of 8-10.

The silica used in the process of the invention is a silica in which there are hydroxyl groups on the surface. Preference is given to using a fumed silica.

For the purposes of the present invention, the term "silica" is intended to embrace mixed oxides and doped silicas whose principal constituent, with a fraction of more than 50 wt %, better still more than 90 wt %, most preferably more than 99 wt %, is silicon dioxide.

Examples of suitable mixed oxide components are Al or Ti. Particularly suitable is a mixed Si—Al oxide in which an Al atom is part of the particle surface and in which the $Al_2O_3/SiO_2$ weight ratio is 0.1:99.9-5:95.

It is also possible to use silicas doped with alkali metal, more particularly with potassium. The fraction of potassium, calculated as $K_2O$, is 0.005-5 wt %, and the BET surface area is from 100 to 350 m$^2$/g. Silicas of these kinds are disclosed for example in WO2008/071462, EP1216956 or WO2006/134014. These silicas have a very low degree of aggregation and are easily dispersed in spite of a high BET surface area.

For the process of the invention, the agent for surface modification is selected preferably from the group consisting of $X_{4-a}$[Si—$(CH_2)_n$—$Y_m$—R]$_a$ where
a=1, 2 or 3; preferably a=1; n=1, 2 or 3; m=0 or 1,
X=H, OH, $OCH_3$, $OC_2H_5$, $OCH_2CH_2H_3$, $OCH(CH_3)_2$; Cl,
Y=—(OCR$^1$R$^2$—CR$^3$R$^4$)$_o$—, o=1-30, R$^1$, R$^2$, R$^3$, R$^4$=independently of one another H or $CH_3$, more preferably o=5-15 and R$^1$, R$^2$, R$^3$, R$^4$=H;
—(OCR$^1$R$^2$—CR$^3$R$^4$—CR$^6$R$^6$)$_p$—, p=1-30, R$^1$, R$^2$, R$^3$, R$^4$, R$^5$, R$^6$=independently of one another H or $CH_3$,-

R is a radical which does not impart hydrophobic properties, and preferably
if m is 1,
R=—H, —CH$_3$, —C$_2$H$_5$, —OH, —OCH$_3$, —OC$_2$H$_5$, —C(=O)OCH$_3$, —C(=O)OC$_2$H$_5$, —O—C(=O)CH$_3$, —O—C(=O)CH$_3$, —O—C(=O)CH=CH$_2$, —O—C(=O)CH=CH(CH$_3$), —C(=O)CH$_3$, —C(=O)H, NH$_2$;

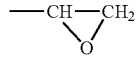

and, if m is 0, R corresponds to the aforementioned radicals but without —H, —CH$_3$, —C$_2$H$_5$.
Y=—(OCR$^1$R$^2$—CR$^3$R$^4$)$_o$—, o=1-30, R$^1$, R$^2$, R$^3$, R$^4$=independently of one another H or CH$_3$, more preferably o=5-15 and R$^1$, R$^2$, R$^3$, R$^4$=H;
—(OCR$^1$R$^2$—CR$^3$R$^4$—CR$^6$R$^6$)$_p$—, p=1-30, R$^1$, R$^2$, R$^3$, R$^4$, R$^5$, R$^6$=independently
or is a mixture of the aforementioned radicals R and Y.

It is also conceivable for Y to comprise branched polyethylene glycols. In that case R and at least one of the radicals R$^1$-R$^6$ is a —(OCH$_2$—CH$_2$)$_r$ moiety, where r=5-15.

With particular preference the agent for surface modification may be selected from the group consisting of (CH$_3$O)$_3$Si(CH$_2$)$_3$—OCH$_3$, (CH$_3$O)$_3$Si(CH$_2$)$_3$—(OCH$_2$CH$_2$)$_3$—OCH$_3$, (CH$_3$O)$_3$Si(CH$_2$)$_3$—(OCH$_2$CH$_2$)$_{6-9}$—OCH$_3$, (CH$_3$O)$_3$Si(CH$_2$)$_3$—(OCH$_2$CH$_2$)$_{9-12}$—OCH$_3$, (CH$_3$O)$_3$Si(CH$_2$)$_3$—(OCH$_2$CH$_2$)$_{21-24}$—OCH$_3$ and (CH$_3$CH$_2$O)$_3$Si(CH$_2$)$_3$—(OCH$_2$CH$_2$)$_{8-12}$OH.

Furthermore, the agent for surface modification may be selected from the group consisting of (RO)$_3$Si—(CH$_2$)$_3$—NH$_2$, (RO)$_3$Si—(CH$_2$)$_3$—CH—CH$_2$—NH$_2$, (RO)$_3$Si—(CH$_2$)$_3$—NH—(CH$_2$)$_2$—NH$_2$, (RO)$_3$Si—(CH$_2$)$_3$—NH—(CH$_2$)$_2$NH(CH$_2$)—NH$_2$, (RO)$_3$Si—(CH$_2$)$_3$—N—[(CH$_2$)$_2$NH(CH$_2$)—NH$_2$]$_2$, R=CH$_3$, C$_2$H$_5$.

Additionally suitable for the surface modification are aqueous compositions which comprise organopolysiloxanes having glycidyl ether alkyl radicals, acryloyloxyalkyl radicals and/or methacryloyloxyalkyl radicals. Furthermore, as further functional groups, the organopolysiloxane may comprise aminoalkyl radicals or alkyl radicals or aminoalkyl and alkyl radicals. Each silicon atom in the organopolysiloxane preferably carriers a functional group. The organopolysiloxane-containing compositions may be obtained by mixing water-soluble organosilanes of the formula I H$_2$N(CH$_2$)$_f$(NH)$_g$(CH$_2$)$_i$—Si(CH$_3$)$_h$(OR)$_{3-h}$    (I), where 0≤f≤6, g=0 if f=0, g=1 if f>1, 0≤i≤6, 0≤h≤1 and R is a methyl, ethyl, propyl or isopropyl group, preferably aminopropyltriethoxysilane,
with
water-soluble organosilanes of the formula II which, however, are not stable in the aqueous medium X—CH$_2$O(CH$_2$)$_3$—Si(CH$_3$)$_h$(OR)$_{3-h}$    (II), where 0≤h≤1 and R is a methyl, ethyl, propyl or isopropyl radical, preferably glycidyloxypropyltrimethoxysilane, and
X=

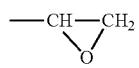

and/or
organosilanes of the formula III

H$_2$C=CR'—COO(CH$_2$)$_3$—Si(CH$_3$)$_h$(OR)$_{3-h}$    (III), where 0≤h≤1, R is a methyl, ethyl, propyl or isopropyl radical and R' is a methyl or hydrogen radical, preferably methacryloyloxypropyltrimethoxysilane,
and non-water-soluble organosilanes of the formula IV R''—Si(CH$_3$)$_h$(OR)$_{3-h}$    (IV), where 0≤h≤1, R is a methyl, ethyl, propyl or isopropyl radical and R'' is a linear, branched or cyclic hydrocarbon radical having 1 to 8 C atoms, preferably propyltrimethoxysilane,
in a molar ratio M=a/(b+c+d), where a is the sum of the number of moles of the organosilanes of formula I, b is the sum of the number of moles of the organosilanes of formula II, and c is the sum of the number of moles of the organosilanes of formula III, and d is the sum of the number of moles of the organosilanes of formula IV, where 0≤M≤3 and at least b>0 or c>0.

The mixture is admixed with a water/acid mixture, the pH of the reaction mixture is adjusted to a value between 1 and 8, and the alcohol is removed.

In idealized form, the organopolysiloxane-containing compositions can be represented according to the formula HO[Si(A*)(OH)$_z$(CH$_3$)$_{1-z}$O]$_a$[Si(B*)(OH)$_y$(CH$_3$)$_{1-y}$O]$_b$ [Si(C*)(OH)$_w$(CH$_3$)$_{1-w}$O]$_c$[Si(D*)(OH)$_v$(CH$_3$)$_{1-v}$O]$_d$H(HX)$_e$    (V)

where A* is an aminoalkyl radical derived from the formula I,
B* is a glycidyl ether alkyl radical derived from the formula II,
C* is an acryloyloxyalkyl or methacryloyloxyalkyl radical derived from the formula III, and
D* is an alkyl radical according to the general formula IV,
HX is an acid, where X is an inorganic or organic acid radical,
v is 0 or 1 and w is 0 or 1 and y is 0 or 1 and z is 0 or 1 and a+b+c+d≥4 and a≤e≤2 a, where 0≤a/(b+c+d)≤3.

The organopolysiloxane-containing compositions preferably have a pH of 1-8, more preferably of 3-6.

A readily redispersible, surface-modified powder can be obtained from the aqueous dispersion of the invention by removal of the liquid phase, by means of spray drying, for example. This powder can be incorporated into an aqueous phase by low energy input, as for example by stirring, without any significant aggregation of the particles. The particle diameters in this dispersion can be 40-200 nm.

A further subject of the invention is therefore a surface-modified hydrophilic silica which
a) has an aluminium atom which is bonded via an oxygen atom to a silicon atom of the particle surface,
b) comprises a hydrocarbon radical which comprises a silicon atom which is bonded to a carbon atom of the hydrocarbon radical,
c) has a BET surface area of 40-500 m$^2$/g and
d) possesses an average particle diameter dal in the dispersion of 40-200 nm, preferably 60-150 nm and
e) has a surface modification selected from the group consisting of
Si—(CH$_2$)$_n$—Y$_m$—R, Si being the Si atom which is bonded via a C atom to a hydrocarbon radical, and
n=1, 2, 3; m=0 or 1,
X=H, OH, OCH$_3$, OC$_2$H$_5$, Cl,
Y=—(OCR$^1$R$^2$—CR$^3$R$^4$)$_o$—, o=1-30, R$^1$, R$^2$, R$^3$, R$^4$=independently of one another H or CH$_3$,
—(OCR$^1$R$^2$—CR$^3$R$^4$—CR$^6$R$^6$)$_p$—, p=1-30, R$^1$, R$^2$, R$^3$, R$^4$, R$^5$, R$^6$=independently of one another H or CH$_3$, R is a radical which does not impart hydrophobic properties, and preferably
if m=1,
R=—H, —CH$_3$, —C$_2$H$_5$, —OH, —OCH$_3$, —OC$_2$H$_5$, —C(=O)OCH$_3$, —C(=O)OC$_2$H$_5$, —O—C(=O)CH$_3$, —O—C(=O)CH$_3$, —O—C(=O)CH=CH$_2$, —O—C(=O)CH=CH(CH$_3$), —C(=O)CH$_3$, —C(=O)H, NH$_2$;

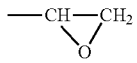

and, if m=0, R corresponds to the aforementioned radicals but without —H, —CH$_3$, —C$_2$H$_5$.

Y=—(OCR$^1$R$^2$—CR$^3$R$^4$)$_o$—, o=1-30, R$^1$, R$^2$, R$^3$, R$^4$=independently of one another H or CH$_3$, more preferably o=5-15 and R$^1$, R$^2$, R$^3$, R$^4$=H;
—(OCR$^1$R$^2$—CR$^3$R$^4$—CR$^6$R$^6$)$_p$—, p=1-30, R$^1$, R$^2$, R$^3$, R$^4$, R$^5$, R$^6$=independently or is a mixture of the aforementioned radicals R and Y.

The BET surface area of the surface-modified, hydrophilic silica is 40-500 m$^2$/g, more preferably 80-300 m$^2$/g. The BET surface area is determined in accordance with DIN 66131.

A further subject of the invention is the use of the aqueous dispersion of the invention and of the surface-modified, hydrophilic silica of the invention in each case as a constituent of pharmaceutical preparations, cosmetic preparations, water-based paints and inks, of cleaning products, of dishwashing detergents and of coloured coating slips in the paper industry.

EXAMPLES

Salt Stability at 60° C.

In 900 g of fully demineralized water (DI water), 28.500 g of NaCl, 0.220 g of NaHCO$_3$, 4.066 g of Na$_2$SO$_4$, 1.625 g of CaCl$_2$×2H$_2$O, 3.162 g of MgCl$_2$×6H$_2$O, 0.024 g of SrCl$_2$×6H$_2$O and 0.721 g of KCl are dissolved and the solution is made up to 1 litre with DI water.

99.5 g of this solution are introduced in a 125 ml wide-necked flask made of NALGENE® FEP (tetrafluoroethylene-hexafluoropropylene copolymer; Thermo Scientific), 0.5 g of the dispersion under test is added, and the system is homogenized by shaking. The mixture is stored in a drying cabinet at 60° C. and the incidence of a precipitate is monitored visually.

Substances Used

AERODISP® W 7512 S, Evonik Industries, is an acidic, low-viscosity, aqueous silica dispersion having a solids content of 12%. The solid on which it is based is AEROSIL® 200, Evonik Industries, a pyrogenic silica having a BET surface area of 200 m$^2$/g.

AERODISP® W 7520 N, Evonik Industries, is a low-viscosity, aqueous silica dispersion having a solids content of 20%, stabilized with aqueous sodium hydroxide solution. The solid on which it is based is AEROSIL® 200, Evonik Industries, a fumed silica having a BET surface area of 200 m$^2$/g.

AERODISP® W 7330 N, Evonik Industries, is an aqueous silica dispersion having a solids content of 30%, stabilized with aqueous sodium hydroxide solution. The solid on which it is based is AEROSIL® 130, Evonik Industries, a fumed silica having a BET surface area of 130 m$^2$/g.

AERODISP® W 7320 N, Evonik Industries, is an aqueous silica dispersion having a solids content of 20%, stabilized with aqueous sodium hydroxide solution. The solid on which it is based is AEROSIL® 130, Evonik Industries, a fumed silica having a BET surface area of 130 m$^2$/g.

Dispersion of Potassium-Doped Silica

A 100 l stainless steel batching vessel was charged with 45.0 kg of water. Subsequently, with the aid of the suction hose of the Ystral Conti-TDS 3 (stator slots: 4 mm ring and 1 mm ring, rotor/stator distance about 1 mm), under shearing conditions, 30 kg of potassium-doped silica are introduced under suction. The potassium-doped silica corresponds to Example P1 from WO2008/071462. It has a BET surface area of 216 m$^2$/g. The K fraction is 0.12 wt %, calculated as K$_2$O. After the end of the addition, the suction port is closed and shearing is continued at 3000 rpm for 20 minutes. Using 20 kg of water, the dispersion is diluted and a pH of 10.0 is set using aqueous sodium hydroxide solution. This is followed by dilution with water to reach an SiO$_2$ content of 25 wt %, followed by renewed shearing for about 5 minutes for homogenization.

AERODISP® W 630, Evonik Industries, is an aqueous aluminium oxide dispersion having a pH of 3-5 and a solids content of 30%. The solid on which it is based is AEROXIDE® Alu C, Evonik Industries, a fumed aluminium oxide having a BET surface area of 100 m$^2$/g.

Sodium aluminate solution, 10 wt %, produced from anhydrous technical sodium aluminate, Sigma-Aldrich, and DI water. A few minor residual insolubles are removed by filtration.

LUDOX® SM 30, Grace, is an aqueous, NaOH-stabilized, colloidal silica dispersion having a particle size of 8 nm and an SiO$_2$ content of 30 wt %.

LUDOX® HS 40, Grace, is an aqueous, NaOH-stabilized, colloidal silica dispersion having a particle size of 12 nm and an SiO$_2$ content of 40 wt %.

LUDOX® CL, Grace, is an aqueous dispersion of Al-clad, colloidal silica with 22 nm particle size. The pH is 3.5-4.5, the solids content 39-43 wt %.

Agents for Surface Modification

OM1: 2-[Methoxy(polyethyleneoxy)$_{6-9}$propyl]trimethoxysilane

OM2: Hydrolysate of 3-glycidyloxypropyltrimethoxysilane as per Example 1, EP-A-832911

OM3: DYNASYLAN® GLYMO, Evonik Industries

Water: this is fully demineralized (DI) water; aqueous sodium hydroxide solution: 25 wt % NaOH; hydrochloric acid: 20 wt % HCl Example 1 (Inventive)

A dilute sodium aluminate solution composed of 10 g of DE water and 2.37 g of the filtered sodium aluminate solution is admixed slowly dropwise and with stirring with 40 g of AERODISP® W 7320. Following the addition, stirring is continued for 10 minutes more. Then 5.90 g of OM2 are added. The mixture is subsequently heated at 90° C. for 10 minutes and the pH is adjusted to 9 using hydrochloric acid.

0.064 mg Al/m$^2$ BET surface area; d$_{50}$=128 nm; stability in reference solution at 60° C.: 4 weeks.

Example 2 (Inventive)

2.19 g of the sodium aluminate solution are added to 10 g of water. Then, dropwise and with stirring, 40 g of AERODISP® W 7512 S are added and, after the addition, stirring is continued for 10 minutes. Then 3.1 g of OM3 are added dropwise and the mixture is heated to 90° C. with stirring. After 10 minutes, it is cooled to room temperature and the pH is adjusted to 9 using hydrochloric acid.

0.064 mg Al/m$^2$ BET surface area; $d_{50}$=109 nm; stability in reference solution at 60° C.: 9 weeks

Example 3 (Inventive)

2.19 g of the sodium aluminate solution are added to 10 g of water. Then, dropwise and with stirring, 40 g of AERODISP® W 7512 S are added and, after the addition, stirring is continued for 10 minutes. Then 6.8 g of OM1 are added dropwise and the mixture is heated to 90° C. with stirring. After 10 minutes, it is cooled to room temperature and the pH is adjusted to 9 using hydrochloric acid.

0.064 mg Al/m$^2$ BET surface area; $d_{50}$=111 nm; stability in reference solution at 60° C.: 3 months

Example 4 (Inventive)

3.64 g of the sodium aluminate solution are added to 10 g of water. Then, dropwise and with stirring, 40 g of AERODISP® W7520 N are added and, after the addition, stirring is continued for 10 minutes. Then 6.8 g of OM1 are added dropwise and the mixture is heated to 90° C. with stirring. After 10 minutes, it is cooled to room temperature and the pH is adjusted to 9 using hydrochloric acid.

0.064 mg Al/m$^2$ BET surface area; $d_{50}$=101 nm; stability in reference solution at 60° C.: 4 weeks

Example 5 (Inventive)

400 g of water are introduced as an initial charge, and 45.5 g of the sodium aluminate solution and 200 g of the dispersion of potassium-doped silica are incorporated with the aid of a dissolver. This is carried out a total of 4 times, giving a total of 182 g of sodium aluminate solution and 800 g of the dispersion. With the last addition there is a sharp rise in the viscosity. Then OM1 is added with stirring, with the dispersion becoming highly fluid again. The dispersion is then heated to 90° C. and the temperature is maintained for 30 minutes. After the dispersion has cooled to room temperature, a pH of 9 is set using hydrochloric acid.

0.128 mg Al/m$^2$ BET surface area; $d_{50}$=72 nm; stability in reference solution at 60° C.: 4 weeks

Example 6 (Comparative Example)

1.185 g of the sodium aluminate solution are added to 10 g of water. Then 10 g of AERODISP® W 7320 N are added slowly and with stirring. This is followed again by addition of 1.185 g of the sodium aluminate solution and 10 g of AERODISP® W 7320 N. This procedure is repeated twice more, giving in total a use of 4.74 g of the sodium aluminate solution and 40 g of AERODISP® W 7320 N. The resulting dispersion is subsequently aged at 85° C. for 30 minutes.

Following addition of 7.36 g of OM1, stirring is continued at 85° C. for 15 minutes more. After the dispersion has cooled to room temperature, a pH of 9 is set using hydrochloric acid.

0.128 mg Al/m$^2$ BET surface area; $d_{50=119}$ nm; stability in reference solution at 60° C.: 1 week

Example 7 (Comparative Example)

40 g of water are admixed with stirring with 1 g of the sodium aluminate solution and then with 5 g of a silica sol prepared from 20 g of Ludox® HS 40 from Grace and 20 g of water. This gradual addition is repeated until a total of 8 g of the sodium aluminate solution and 40 g of the silica sol have been added. The addition of the sodium aluminate solution produces small flakes, which slowly dissolve again after the dispersion is added. Stirring is then continued at 70° C. for 3 hours.

Subsequently 10 g of OM2 are added and the mixture is heated to 90° C. After 10 minutes at 90° C., cooling takes place to room temperature and the pH is adjusted to 9 using hydrochloric acid.

0.127 mg Al/m$^2$ BET surface area; stability in reference solution at 60° C.: 3-4 days

Example 8 (Comparative Example)

67 g of AERODISP® W 7512 S are admixed slowly and with stirring with 11.3 g of OM1. To start with there is a rise in viscosity, which drops off again, however, on further addition. Then aqueous sodium hydroxide solution is used to set a pH of 11, with stirring, and the mixture is heated to 90° C. After 10 minutes at 90° C., it is cooled and a pH of 9 is set using hydrochloric acid.

Stability in reference solution at 60° C.: 1 day

Example 9 (Comparative Example)

40 g of AERODISP® W 7520 N are admixed slowly and with stirring with 11.3 g of OM1. Then aqueous sodium hydroxide solution is used to set a pH of 11, with stirring, and the mixture is heated to 90° C. After 10 minutes at 90° C., it is cooled and a pH of 9 is set using hydrochloric acid.

Stability in reference solution at 60° C.: 1 day

Example 10 (Comparative Example)

100 g of a LUDOX® 30 SM dispersion diluted with water to 10 wt % are admixed dropwise with stirring with 4.3 g of OM1 over the course of 3 hours at 80° C. Stirring at 80° C. is continued for 6 hours.

Stability in reference solution at 60° C.: 1 day

Example 11 (Comparative Example)

249 g of LUDOX® HS 40 are admixed with 30 g of OM1. The dispersion is heated at 80° C. and stirred at this temperature for 16 hours.

Stability in reference solution at 60° C.: 1 day

Example 12 (Comparative Example)

26.7 g of LUDOX® CL are diluted with 13.3 g of water to 20 wt %. This sol is admixed slowly and with stirring with 13.0 g of OM1. Then aqueous sodium hydroxide solution is used to set a pH of 11, with stirring, and the mixture is heated to 90° C. After 10 minutes at 90° C., it is cooled and a pH of 9 is set using hydrochloric acid.

After two days at 60° C., a cloudy precipitate occurs.

0.174 Al/m$^2$ BET surface area (calculated from manufacturer figures)

Stability in reference solution at 60° C.: 2 days

Example 13 (Comparative Example)

26.7 g of AERODISP® W 630 are diluted to 20% with 13.3 g of water. This dispersion is admixed slowly and with stirring with 5.67 g of OM1. Aqueous sodium hydroxide solution is then used to set a pH of 11, with stirring, and the mixture is heated to 90° C. After 10 minutes at 90° C., it is cooled, and a pH of 9 is set using hydrochloric acid.

Stability in reference solution at 60° C.: 1 day

The aqueous dispersions of the invention from Examples 1-4 exhibit very good stability in the reference solution at elevated temperatures. This stability is not the case for Comparative Examples 5-13.

The invention claimed is:

1. A process for preparing an aqueous dispersion comprising particles of a surface-modified, hydrophilic silica, wherein:
   a) the particles of the surface-modified, hydrophilic silica comprise an aluminium atom and a hydrocarbon radical, wherein:
      i) the aluminium atom is bound to a silicon atom of the particle surface via an oxygen atom;
      ii) the hydrocarbon radical comprises a silicon atom which is bound to a carbon atom of the hydrocarbon radical; and
      ii) the average particle diameter $d_{50}$ in the dispersion is 40-200 nm; and
   b) the pH of the aqueous dispersion is 8 or higher,
   and wherein the process comprises the steps:
   aa) adding silica particles comprising hydroxyl groups on their surface to an aqueous solution of an alkali metal aluminate and allowing the silica particles to react;
   bb) subsequently adding an agent for surface modification in which a silicon atom is bound to a hydrocarbon radical by a carbon atom and the silicon atom is also bound to one or more hydroxyl groups, alkoxy groups, halide groups or mixtures thereof; and
   cc) allowing the mixture to react, during which pH may optionally be adjusted and the hydrolysis product may optionally be removed.

2. The process of claim 1, wherein, in step aa), the silica particles are introduced in the form of an aqueous dispersion.

3. The process of claim 1, wherein a mixture formed in step bb) is reacted at a pH of 11 or higher, and the mixture is treated thermally at a temperature of 50-95° C. over a period of 1-30 minutes.

4. The process of claim 1, wherein, in step aa), a mixed Si—Al oxide is used in which an Al atom is part of the particle surface and the weight ratio of $Al_2O_3/SiO_2$ is 0.1:99.9-5:95.

5. The process of claim 1, wherein, in step aa), a potassium-doped silica having a potassium content, calculated as $K_2O$, of 0.005-5 wt % and having a BET surface area of 100 to 350 m²/g is used.

6. The process of claim 1, wherein the agent for surface modification in step bb) has the formula: $X_{4-a}Si—[(CH_2)_n—Y_m—R]_a$, wherein:
   a=1, 2 or 3; n=1, 2 or 3; and m=0 or 1;
   X=H, OH, $OCH_3$, $OC_2H_5$, $OCH_2CH_2H_3$, $OCH(CH_3)_2$, Cl;
   Y=—$(OCR^1R^2—CR^3R^4)_o$— wherein o=1-30 and $R^1$, $R^2$, $R^3$, $R^4$=independently of one another H or $CH_3$;
   —$(OCR^1R^2—CR^3R^4—CR^5R^6)_p$—, wherein p=1-30, $R^1$, $R^2$, $R^3$, $R^4$, $R^5$, and $R^6$=independently of one another H or $CH_3$; and
   R is a radical which does not impart hydrophobic properties, or is a mixture of the aforementioned radicals R and Y.

7. The process of claim 6, wherein,
   if m=1,
   R is —H, —$CH_3$, —$C_2H_5$, —OH, —$OCH_3$, —$OC_2H_5$, —C(=O)$OCH_3$, —C(=O)$OC_2H_5$, —O—C(=O)$CH_3$, —O—C(=O)$CH_3$, —O—C(=O)CH=$CH_2$, —O—C(=O)CH=CH($CH_3$), —C(=O)$CH_3$, —C(=O)H, $NH_2$, or

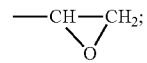

and, if m=0, the aforementioned radicals R are without —H, —$CH_3$, —$C_2H_5$.

8. The process of claim 1, wherein the agent for surface modification in step bb) is selected from the group consisting of: $(CH_3O)_3Si(CH_2)_3$—$OCH_3$; $(CH_3O)_3Si(CH_2)_3$—$(OCH_2CH_2)_3$—$OCH_3$; $(CH_3O)_3Si(CH_2)_3$—$(OCH_2CH_2)_{6-9}$—$OCH_3$; $(CH_3O)_3Si(CH_2)_3$—$(OCH_2CH_2)_{9-12}$—$OCH_3$; $(CH_3O)_3Si(CH_2)_3$—$(OCH_2CH_2)_{21-24}$—$OCH_3$; and $(CH_3CH_2O)_3Si(CH_2)_3$—$(OCH_2CH_2)_{8-120}H$.

9. The process of claim 1, wherein the agent for surface modification in step bb) is selected from the group consisting of: $(RO)_3Si$—$(CH_2)_3$—$NH_2$; $(RO)_3Si$—$(CH_2)_3$—$CH$—$CH_2$—$NH_2$; $(RO)_3Si$—$(CH_2)_3$—$NH$—$(CH_2)_2$—$NH_2$; $(RO)_3Si$—$(CH_2)_3$—$NH$—$(CH_2)_2NH(CH_2)$—$NH_2$; $(RO)_3Si$—$(CH_2)_3$—$N$—$[(CH_2)_2NH(CH_2)$—$NH_2]_2$; and R=$CH_3$, $C_2H_5$.

10. The process of claim 1, wherein the agent for surface modification in step bb) is an aqueous composition which carries organopolysiloxanes having glycidyl ether alkyl radicals, acryloyloxyalkyl radicals and/or methacryloyloxyalkyl radicals, with each silicon in the organopolysiloxane carrying a functional group.

11. The process of claim 10, wherein, in step bb), an organopolysiloxane is used which was obtained by mixing water-soluble organosilanes of the formula I:

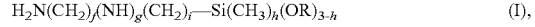

wherein if 0≤f≤6, g=0; if f=0, g=1; if f>1, 0≤i≤6 and 0≤h≤1; and
R is a methyl, ethyl, propyl or isopropyl group;
with:
i) water-soluble organosilanes of the formula II:

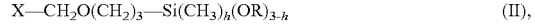

where 0≤h≤1 and R is a methyl, ethyl, propyl or isopropyl radical;
and X=

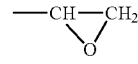

ii) and/or organosilanes of the formula III:

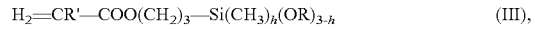

where 0≤h≤1, R is a methyl, ethyl, propyl or isopropyl radical and R' is a methyl or hydrogen radical;
iii) and non-water-soluble organosilanes of the formula IV:

where 0≤h≤1, R is a methyl, ethyl, propyl or isopropyl radical and R" is a linear, branched or cyclic hydrocarbon radical having 1 to 8 C atoms;
in a molar ratio M=a/(b+c+d), where a is the sum of the number of moles of the organosilanes of formula I, b is the sum of the number of moles of the organosilanes of formula II, and c is the sum of the number of moles of the organosilanes of formula III, and d is the sum of the number of moles of the organosilanes of formula IV, where $0 \leq M \leq 3$ and at least $b>0$ or $c>0$.

* * * * *